United States Patent
Kiezulas

(10) Patent No.: US 8,955,542 B2
(45) Date of Patent: Feb. 17, 2015

(54) PRESSURE RELIEF VALVE

(75) Inventor: John C. Kiezulas, Andover, MA (US)

(73) Assignee: TRW Automotive U.S. LLC, Livonia, MI (US)

( * ) Notice: Subject to any disclaimer, the term of this patent is extended or adjusted under 35 U.S.C. 154(b) by 1052 days.

(21) Appl. No.: 12/858,689

(22) Filed: Aug. 18, 2010

(65) Prior Publication Data

US 2011/0041930 A1 Feb. 24, 2011

Related U.S. Application Data

(60) Provisional application No. 61/234,731, filed on Aug. 18, 2009.

(51) Int. Cl.
| | | |
|---|---|---|
| *B60H 1/26* | (2006.01) |
| *F16K 15/03* | (2006.01) |
| *F16K 15/16* | (2006.01) |
| *F16K 24/04* | (2006.01) |
| *B60H 1/24* | (2006.01) |

(52) U.S. Cl.
CPC ............... *F16K 24/04* (2013.01); *B60H 1/249* (2013.01); *F16K 15/031* (2013.01); *F16K 15/033* (2013.01); *F16K 15/035* (2013.01)
USPC ........ 137/512.3; 137/512; 137/527; 137/857; 454/115; 454/162

(58) Field of Classification Search
USPC ........... 137/512, 512.1, 512.3, 527, 855, 857; 137/535; 454/115, 117, 162, 164, 165, 339, 454/340; 267/154, 155
See application file for complete search history.

(56) References Cited

U.S. PATENT DOCUMENTS

| | | | | |
|---|---|---|---|---|
| RE23,974 E | * | 4/1955 | Foster ........................... | 267/170 |
| 3,640,306 A | * | 2/1972 | Vogt ............................. | 137/512.1 |
| 3,767,160 A | * | 10/1973 | McCollum ....................... | 251/61 |
| 3,974,850 A | * | 8/1976 | Pierson .......................... | 137/535 |
| 4,196,745 A | * | 4/1980 | Schutzer ..................... | 137/512.1 |
| 4,209,037 A | * | 6/1980 | Upham .......................... | 137/527 |
| 4,298,023 A | * | 11/1981 | McGinnis ...................... | 137/535 |
| 4,605,041 A | * | 8/1986 | Teumer .......................... | 137/527 |
| 4,667,578 A | | 5/1987 | Hagenah | |
| 4,781,106 A | * | 11/1988 | Frien .............................. | 454/164 |
| 5,105,731 A | * | 4/1992 | Kraus ............................ | 454/162 |
| 5,105,849 A | | 4/1992 | Clough | |
| 5,355,910 A | | 10/1994 | Gies et al. | |
| 5,419,739 A | | 5/1995 | Lewis | |
| 5,492,505 A | | 2/1996 | Bell et al. | |
| 5,503,178 A | * | 4/1996 | Miskelley et al. ............ | 454/165 |
| 5,727,999 A | | 3/1998 | Lewis | |
| 5,855,225 A | * | 1/1999 | Williams, III ................ | 137/535 |
| 5,904,618 A | | 5/1999 | Lewis | |
| 5,909,748 A | * | 6/1999 | LaCroix ......................... | 137/527 |
| 6,273,127 B1 | | 8/2001 | Wade | |
| 7,503,843 B1 | | 3/2009 | Wilmoth | |
| 7,556,559 B2 | | 7/2009 | Rivera et al. | |
| 2010/0099346 A1 | * | 4/2010 | Browne et al. .................. | 454/70 |

* cited by examiner

*Primary Examiner* — John Rivell
(74) *Attorney, Agent, or Firm* — Tarolli, Sundheim, Covell & Tummino LLP

(57) ABSTRACT

An apparatus (10 or 10*a*) for use in venting a compartment of a vehicle includes valve elements (14 and 16 or 14*a* and 16*a*). A biasing spring (130 or 130*a*) is effective to urge one of the valve elements toward a closed condition. A spring connection (134 or 236) is effective to transmit torque urging the one valve element (16 or 16*a*) toward a closed condition. Another valve element (14) may overlie the one valve element (16). Alternatively, the valve elements (14*a* and 16*a*) may be spaced from each other.

22 Claims, 12 Drawing Sheets

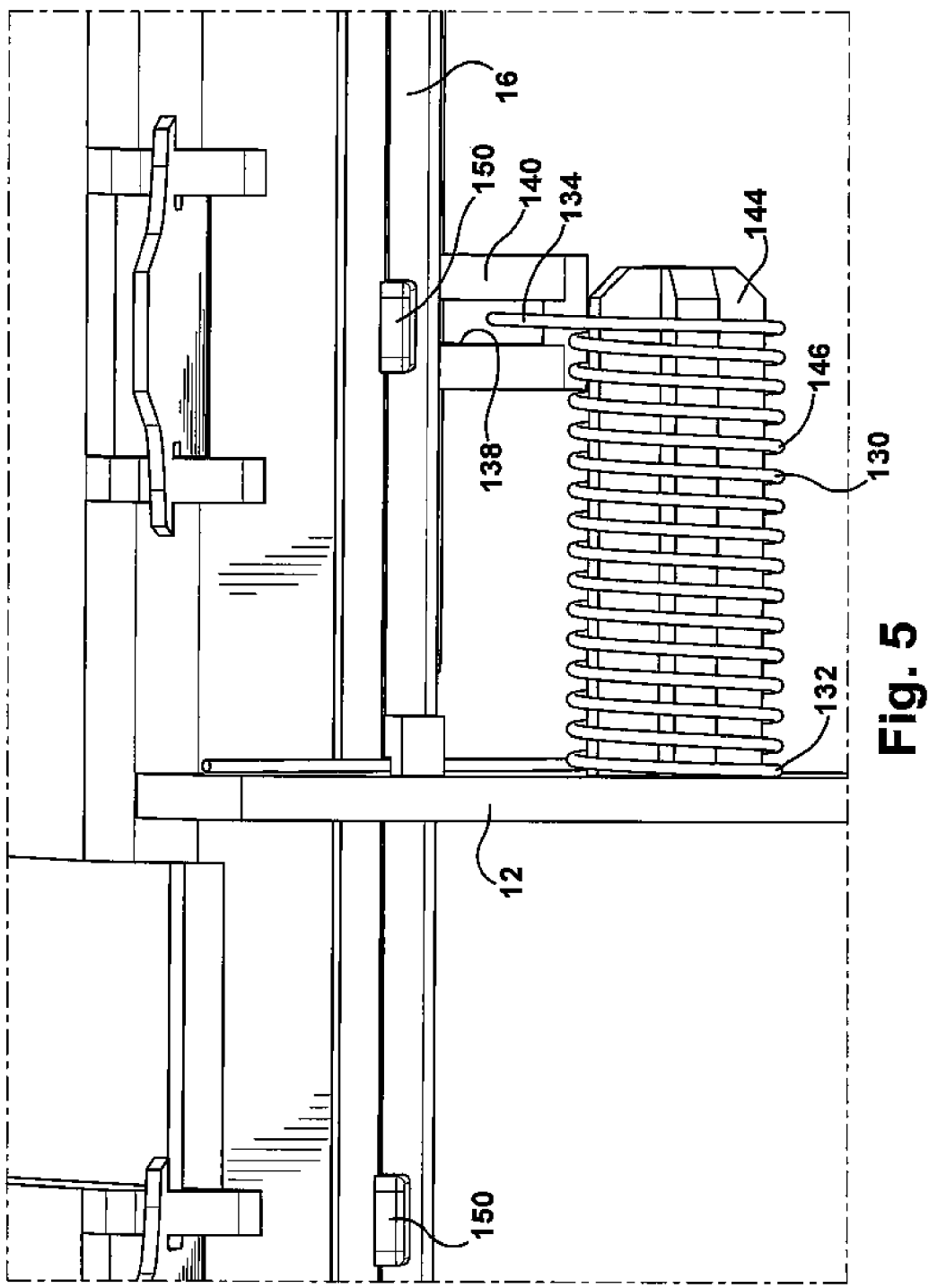

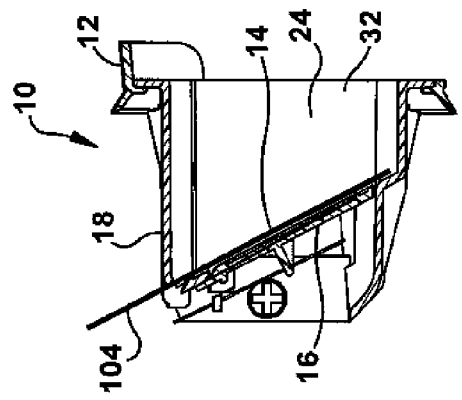
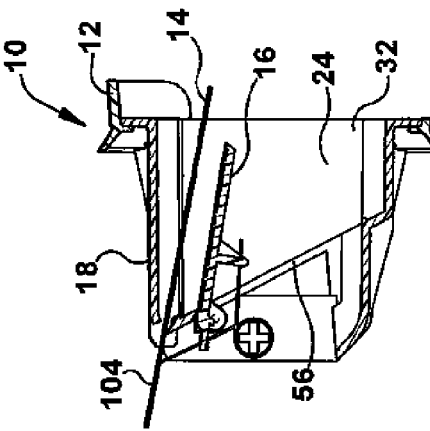
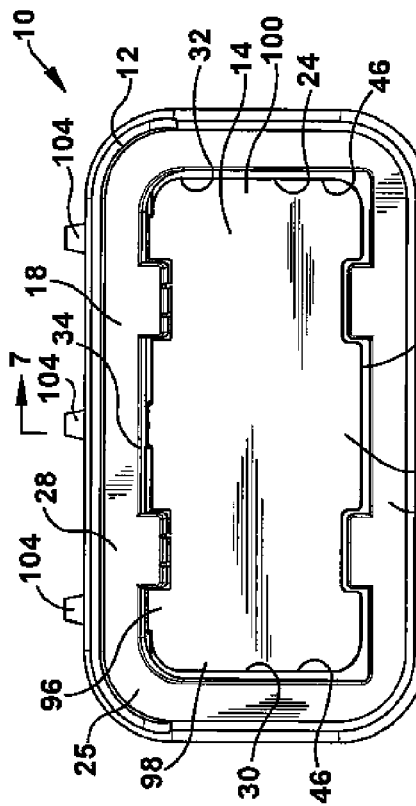
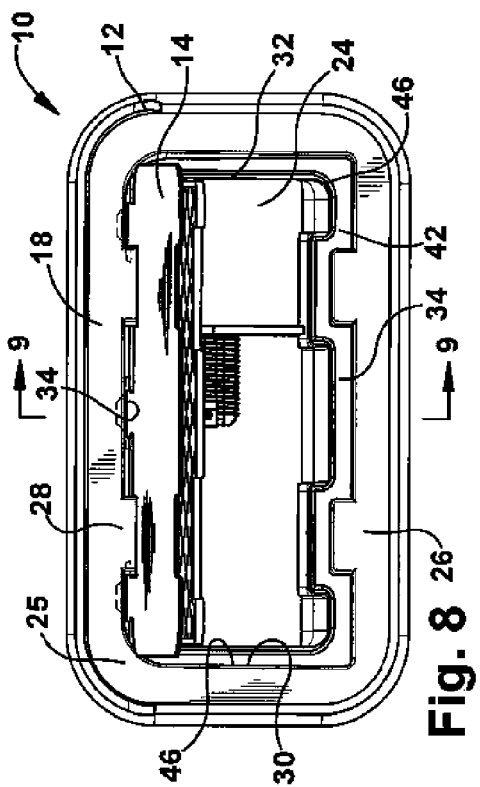

PRESSURE RELIEF VALVE

RELATED APPLICATION

This application claims the benefit of the earlier filing date of U.S. Provisional Application Ser. No. 61/234,731 filed Aug. 18, 2009 and entitled Pressure Relief Valve. The disclosure in the aforementioned Provisional Application Ser. No. 61/234,731 is hereby incorporated herein in its entirety by this reference thereto.

TECHNICAL FIELD

The present invention relates to the field of air vents in vehicles and more particularly, to a pressure relief valve for venting of air pressure out of a motor vehicle.

BACKGROUND OF THE INVENTION

Pressure relief valves are widely used in motor vehicles to relieve air pressure surges or peaks in the passenger compartment which result for example, when the doors are slammed shut. The valves generally comprise a simple rigid frame or housing which mounts in an aperture in a vehicle body panel. A valve element in the form of a flap is connected to the frame to overlie the aperture in the vehicle body panel. The valve element opens relative to the frame to uncover the aperture to relieve air pressure surges.

SUMMARY OF THE INVENTION

An apparatus for use in venting a compartment in a vehicle includes one or more valve elements which are movable from a closed condition to an open condition to enable air to flow through an air flow passage. A spring is effective to urge one of the valve elements toward the closed condition. A spring connection connected with the one valve element is effective to transmit a substantially constant force urging the one valve element toward the closed condition as the one valve element moves toward the open condition. Another valve element may overlie the one valve element. Alternatively, the second valve element may be spaced from the one valve element.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 5 is an enlarged view of a portion of FIG. 4;

FIG. 6 is a front view of the pressure relief valve from outside the compartment showing the pressure relief valve in a closed condition;

FIG. 7 is a sectional view taken along the line B-B of FIG. 6;

FIG. 8 is a front view of the pressure relief valve from outside the compartment showing the pressure relief valve in an open condition;

FIG. 9 is a sectional view taken along the line A-A of FIG. 8;

DESCRIPTION OF EXEMPLARY EMBODIMENTS

Figure 1:
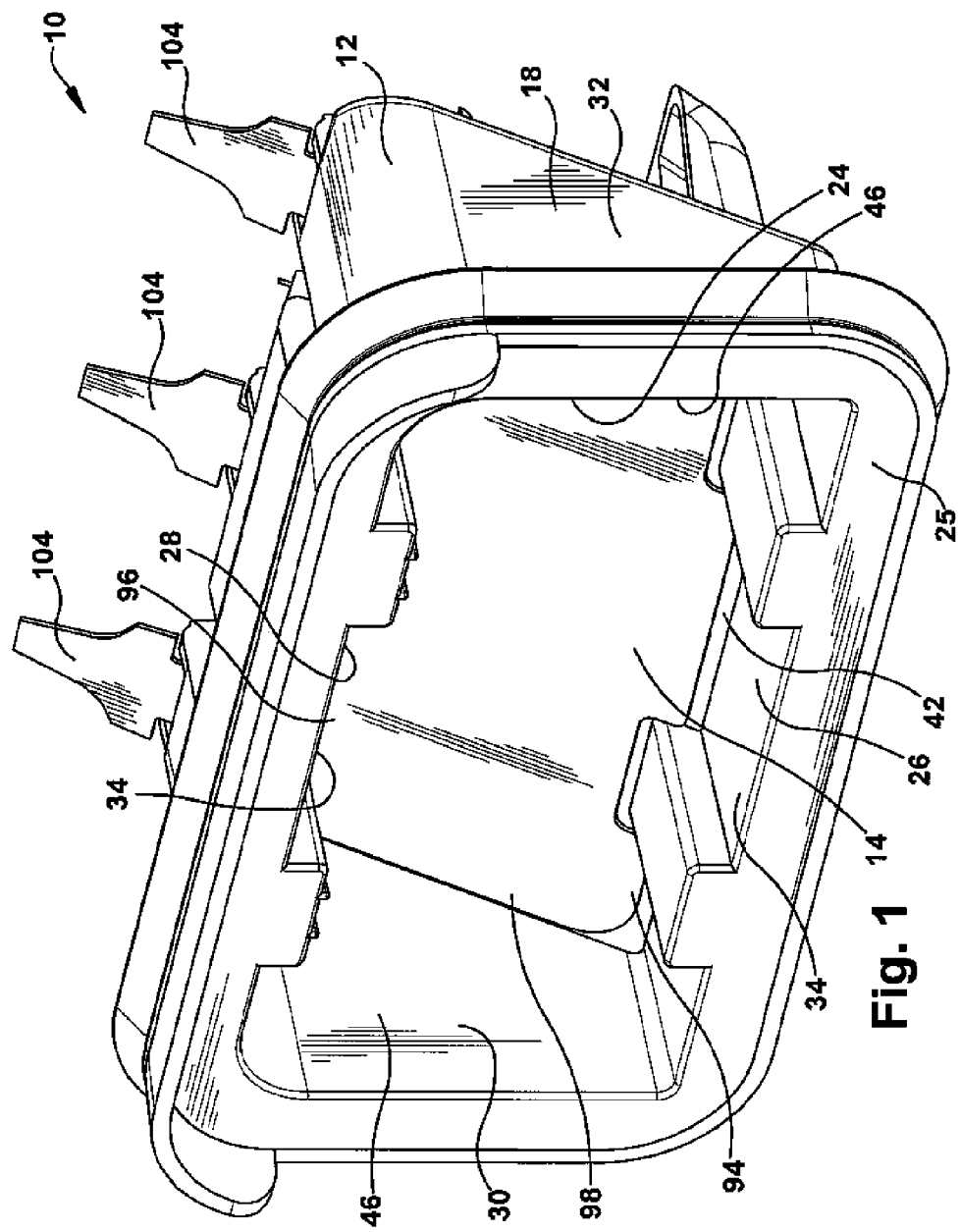
FIG. 1 shows a front view of an exemplary embodiment of a pressure relief valve from outside a compartment.
Figure 2:
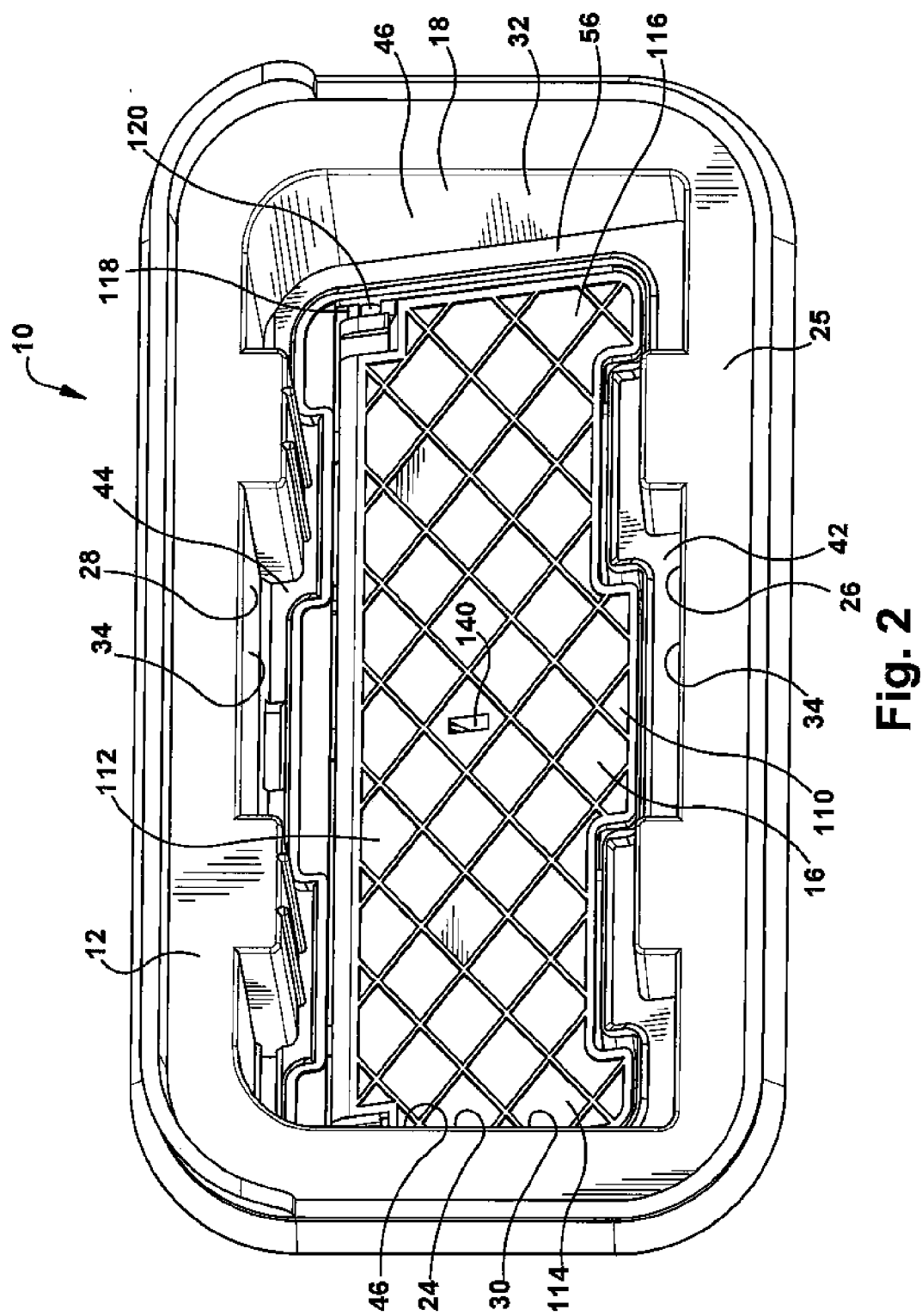
FIG. 2 shows a front view of the pressure relief valve of FIG. 1 with a low pressure valve element removed.

An exemplary embodiment of a pressure relief valve constructed in accordance with the present invention is illustrated in FIGS. 1-2. The pressure relief valve 10 according to the present invention may be located in an aperture of a vertical body panel of a motor vehicle. The pressure relief valve can have alternative locations in the vehicle. The pressure relief valve 10 may be located in the area of the vehicle trunk which is connected to the passenger compartment. The pressure relief valve 10 of the present invention is designed to be mounted on the vertical panel of the vehicle.

The pressure relief valve 10 includes a housing 12 and low and high pressure valve elements or flaps 14 and 16 (FIGS. 1 and 2). The housing 12 is a generally rectangular rigid structure. The housing 12 includes a side wall 18 which extends around the perimeter of the rectangular housing and defines at least one central air flow passage 24. While the housing 12 has been described as having a generally rectangular structure, it should be understood, however, that the housing structure can have any geometry including, for example, square, triangular, polygonal, elliptical, and circular, etc.

The central air flow passage 24 connects the passenger compartment with the atmosphere outside the vehicle and establishes an equalized air pressure between the passenger compartment and the outside atmosphere.

A flange 25 extends around the perimeter of the rectangular housing 12. A flexible seal may extend from the flange 25 and extend peripherally around the rectangular housing 12. When the pressure relief valve 10 is inserted into the aperture in the body panel, the flange 25 and the seal may be forced into contact with the body panel at an area peripherally adjacent the side walls 18 of the housing 12. In the inserted position, the seal is forced to spread outwardly and parallel relative to the body panel. The function of the seal is to help seal the connection between the pressure relief valve 10 and the body panel of the vehicle against air, water, dust and foreign matter from passing through the aperture except through the central air passage 24. The pressure relief valve 10 may be fastened in the aperture of the body panel in any desired manner, such as a latch connection.

The side wall 18 of the housing 12 comprises four side wall sections connected together. First and second longer side wall sections 26, 28 (FIG. 1) are located parallel to each other. First and second shorter side wall sections 30, 32 are located parallel to each other and perpendicular to the first and second longer side wall sections 26, 28.

Figure 3:
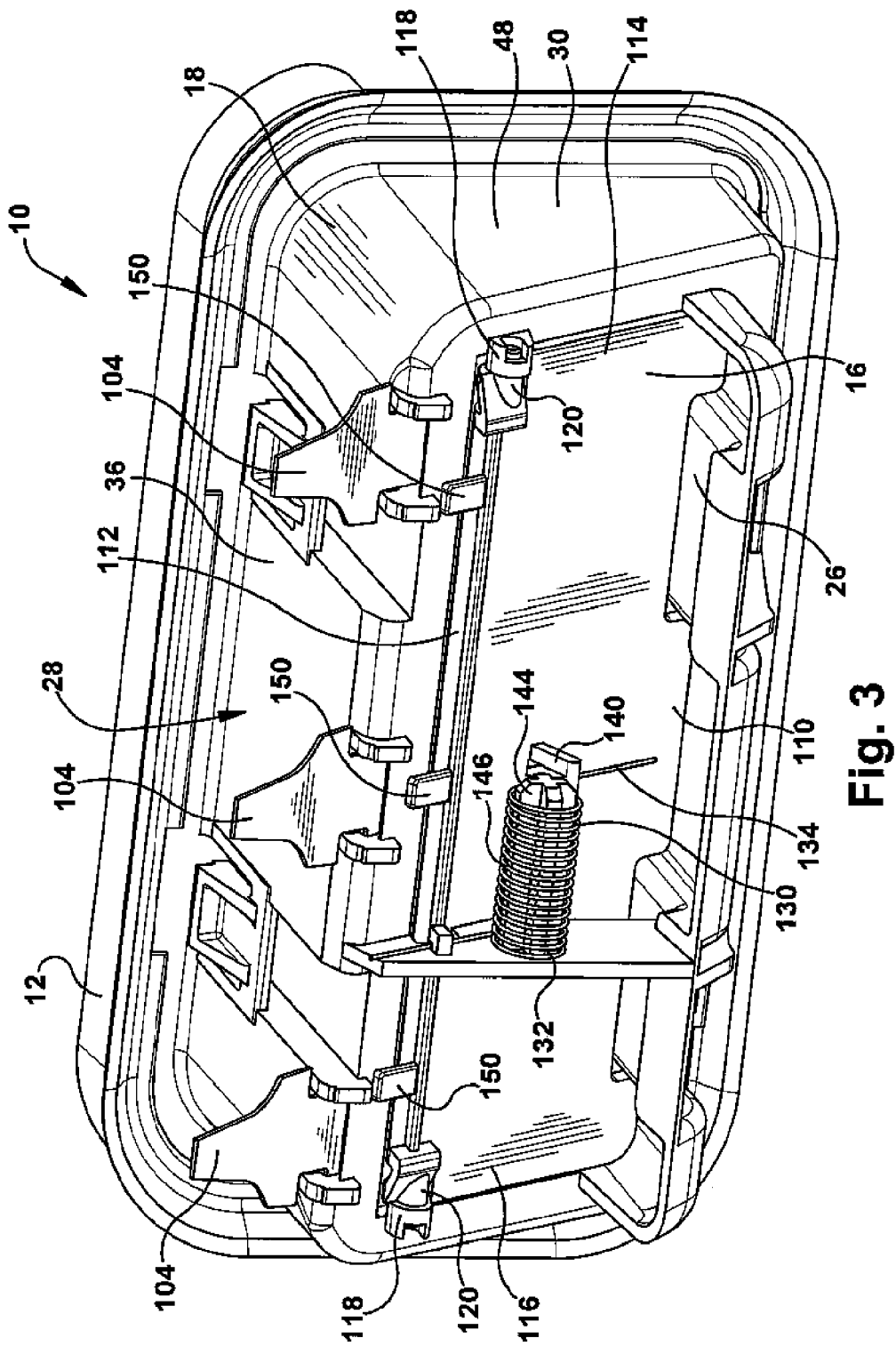
FIG. 3 is a rear view of the pressure relief valve from inside the compartment, showing the pressure relief valve in a closed condition.
Figure 4:
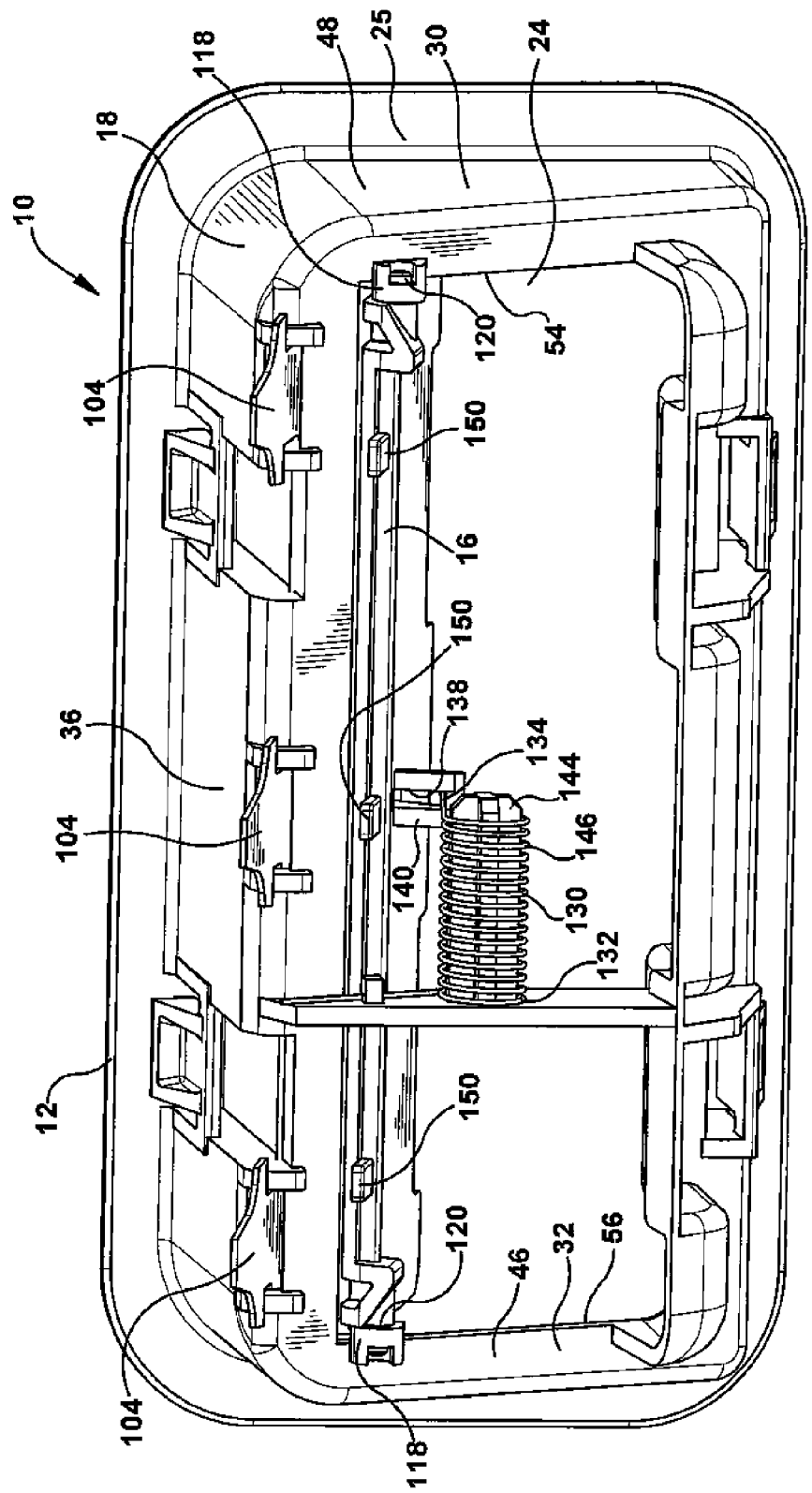
FIG. 4 is a rear view of the pressure relief valve from inside the compartment showing the pressure relief valve in an open condition.

Each of the first and second longer side wall sections 26, 28 have inner surfaces 34 (FIG. 2) and outer surfaces 36 (FIGS. 3 and 4) spaced apart from each other. Each of the first and second longer side wall sections 26, 28 have axially spaced apart top and bottom surfaces. The top and bottom surfaces connect the inner and outer surfaces 34, 36 of each first and second longer side wall section 26, 28.

The inner surface 34 (FIG. 2) of the first longer side wall section 26 includes a flange 42 extending inwardly into the central air flow passage 24 from a location of approximately the top of the inner surface. The inner surface 34 of the second longer side wall 28 has a flange 44 extending inwardly into the central air flow passage 24 from a location near the bottom of the inner surface. The flanges 42, 44 on the inner surfaces 34 of the first and second longer side wall sections 26, 28 are located at different heights along the wall with respect to each other.

Each of the first and second shorter side wall sections 30, 32 have inner and outer surfaces 46, 48 (FIGS. 1 and 3) spaced apart from each other. Each of the first and second shorter side wall sections 30, 32 have axially spaced apart top and bottom surfaces. The top and bottom surfaces connect the inner and outer surfaces 46, 48 of each first and second shorter side wall section 30, 32.

The inner surface 46 of the first shorter side wall section 30 includes a flange 54 (FIG. 4) extending inwardly into the central air flow passage 24 from the inner surface. The inner surface 46 of the second shorter side wall 32 has a flange 56 extending inwardly into the central air flow passage 24 from the inner surface.

The flange 54 extends diagonally along the inner surface 46 of the first shorter side wall 30 from a top portion to a bottom portion of the first shorter side wall to connect the flanges 42 and 44 on the first and second longer side walls 26 and 28. The flange 56 extends diagonally along the inner surface 46 of the second shorter side wall 32 from a top portion to a bottom portion of the second shorter side wall to connect the flanges 42 and 44 on the first and second longer side walls 26 and 28. The diagonal flanges 54, 56 are mirror images of one another.

The low pressure valve element or flap 14 may be referred to as a soft valve element and has a generally solid rectangular structure. It should also be understood that the flap 14 can have any shape, such as triangular or square. The low pressure or soft valve element 14 may be made of an elastomeric material to provide a seal that prevents air, water, dust and foreign matter from entering through the air passage 24 into the passenger compartment when the valve element is in a closed condition. The low pressure or soft valve element 14 has first and second longer peripheral edges 94, 96 located spaced apart and parallel to each other and first and second shorter peripheral edges 98, 100 located spaced apart and parallel to each other.

The low pressure or soft valve element 14 has a plurality of tabs 104 extending from the second longer peripheral edge 96. The tabs 104 extend through openings in the housing 12 to connect the valve element 14 to the housing. It is contemplated that the low pressure or soft valve element 14 may be connected to the housing in any desired manner.

The high pressure valve element or flap 16 may be referred to as a hard valve element and has a generally solid rectangular structure. It should also be understood that the flap 16 can have any shape, such as triangular or square. The high pressure or hard valve element 16 may be made of a material that is harder than the low pressure or soft valve element 14 to help provide a seal that prevents air, water, dust and foreign matter from entering through the air passage 24 into the passenger compartment when the valve elements 14 and 16 are in closed conditions. The high pressure or hard valve element 16 has first and second longer peripheral edges 110, 112 located spaced apart and parallel to each other and first and second shorter peripheral edges 114, 116 located spaced apart and parallel to each other.

The housing 12 has pivot bearings 118 for pivotally connecting the high pressure or hard valve element 16 to the housing. The high pressure or hard valve element 16 has pivot shafts 120 extending from the shorter peripheral edges 114, 116 adjacent the second longer peripheral edge 112. The pivot shafts 120 are received in the pivot bearings 118 to pivotally connect the high pressure or hard valve element 16 to the housing 12.

Figure 10:
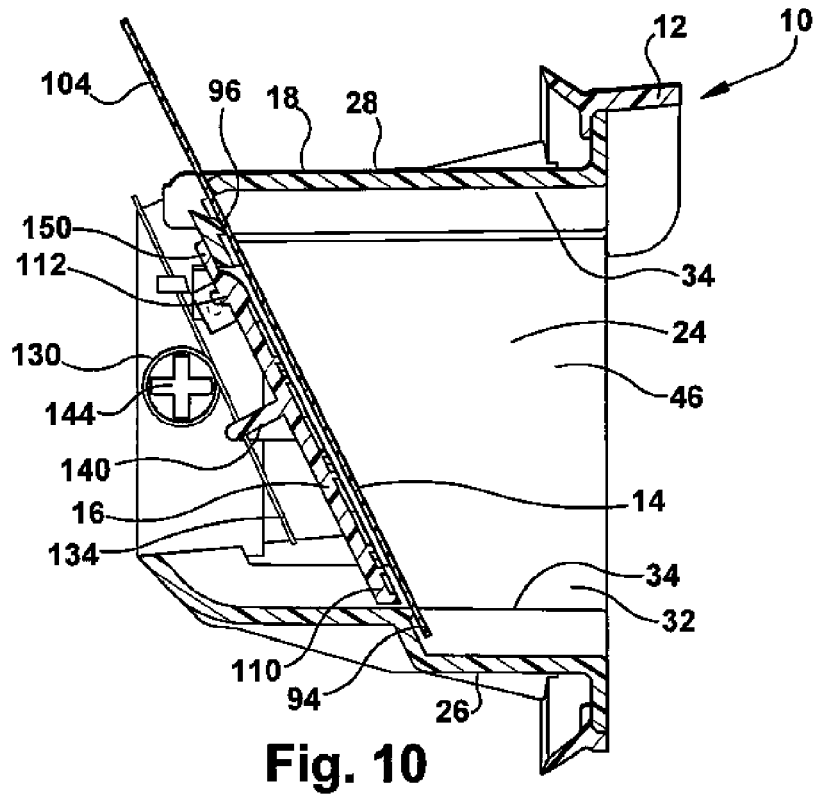
FIG. 10 is an enlarged view of FIG. 7.

A torsion spring 130 applies a force to urge the high pressure or hard valve element 16 toward a closed condition shown in FIGS. 6, 7, and 10. The torsion spring 130 has a first end portion 132 fixedly connected to the housing 12. A second end portion end portion or arm 134 of the torsion spring 130 extends through a slot 138 in a projection 140 extending from the high pressure or hard valve element 16. The second end portion or arm 134 slides in the slot 138 during pivotal movement of the second valve element 16 relative to the housing 12. A support member 144 of the housing 12 extends through a coiled portion 146 of the torsion spring. Although a torsion spring 130 is shown as urging the high pressure or hard valve element toward the closed condition, it is contemplated that any desired spring may be used, such as a leaf spring.

The high pressure or hard valve element 16 may include a plurality of stops 150 extending from the second longer peripheral edge 112 toward the second longer side wall 28 of the housing 12. The stops 150 engage the housing 12 to define the closed condition of the high pressure or hard valve element 16.

The low pressure or soft valve element 14 is movable between a closed condition overlying the central air flow passage 24 and an open condition to permit air flow through the central air flow passage 24 in only one direction. In the closed condition, the first and second shorter side edges 98, 100 are seated on the flanges 54, 56. Similarly, in the closed condition, the first longer peripheral edge 96 of the low pressure or soft valve element 14 is seated on the flange 42 of the first longer side wall section 26. The low pressure or soft valve element 14 may also engage the high pressure or hard valve element 16 when in the closed condition.

The low pressure or soft valve element 14 is held in the closed condition by gravity. It is contemplated that the low pressure or soft valve element 14 may be urged toward the closed condition in any desired manner.

The low pressure or soft valve element 14 can only open in a direction outward of the housing 12 and cannot open in a direction into the housing 12 because the flanges 54, 56 block movement of the valve element inward. The flanges 54, 56 extend in a linear direction horizontally along the first and second longer side walls 26, 28. Since the flanges 42, 44 extend in a diagonal direction along the first and second shorter side walls 30, 32, the low pressure or soft valve element 14 also extends diagonally when the valve element is in the closed condition and seated on the flanges 54, 56 and 42, 44.

The high pressure or hard valve element 16 is movable between a closed condition overlying the central air flow passage 24 and an open condition to permit air flow through the central air flow passage 24 in only one direction. In the closed condition, the stops 150 engage the housing 12. The valve element 16 may be spaced from the flanges 54, 56 and 42, 44 of the housing 12 when in the closed condition to permit limited or restricted air flow through the housing 12. It is contemplated that the valve element 16 may be seated on the flanges 54, 56 and 42, 44 of the housing 12 when in the closed condition.

The high pressure or hard valve element 16 is held in the closed condition by the torsion spring 130 and gravity. It is contemplated that the high pressure or hard valve element 16 may be urged toward the closed condition in any desired manner.

The high pressure or hard valve element 16 can only open in a direction outward of the housing 12 and cannot open in a direction into the housing 12 because the stops 150 block movement of the valve element inward. The high pressure or hard valve element 16 also extends diagonally when the valve element is in the closed condition.

The pressure relief valve 10 of the present invention is operable from the closed condition to the open condition in response to differential air pressure between the passenger compartment of the vehicle and atmosphere outside of the vehicle.

The pressure relief valve 10 is mounted vertically in the body panel of the vehicle. In this orientation, the tabs 104 of the low pressure or soft valve element 14 and the pivot shafts 120 of the high pressure or hard valve element 16 are located near the top when mounted to the body panel. In the closed position, the valve elements 14 and 16 extend in a diagonally downward direction. The valve elements 14 and 16 are acted on by gravity which supplies gravitational force to help keep the valve elements in the closed condition if the difference between the air pressure within the passenger compartment of the vehicle and atmospheric pressure is below a predetermined value. The high pressure or hard valve element 16 is also acted on by the torsion spring 130 to help keep the valve element 16 in the closed condition.

When atmospheric pressure is above the pressure within the passenger compartment of the vehicle, the atmospheric pressure acts against the valve elements 14 and 16 to maintain the valve elements in the closed condition. The low pressure or soft valve element 14 does not rotate since the edges of the valve element are seated against the flanges 42, 54, and 56 and the flanges prevent movement of the valve element relative to the housing inward. The high pressure or hard valve element 16 does not rotate since the stops 150 of the high pressure or hard valve element 16 engage the housing 12. As a result, air flow, water, dust, foreign matter from the atmosphere entering through the central air passage 24 into the passenger compartment of the vehicle is prevented.

When the air pressure within the passenger compartment is greater than atmospheric pressure by a first predetermined level, i.e., a level to overcome the gravitational force upon the low pressure or soft valve element 14, the valve element 14 will rotate, in a direction outward of the housing 12, about a pivot axis to unseat itself from the flanges 42, 54, and 56 of the housing 12. The low pressure or soft valve element 14 moves relative to the housing 12 and the high pressure or hard valve element 16 to uncover the portions of central air passage 24 not covered by the high pressure or hard valve element 16 and enable a limited or restricted air flow from the passenger compartment to atmosphere.

When the low pressure or soft valve element 14 rotates about the pivot axis to unseat itself from the flanges 42, 54, and 56 of the housing 12 and to uncover the central air passage and enable air flow from the passenger compartment to atmosphere, the low pressure or soft valve element 14 is in the open condition. When the differential air pressure between the passenger compartment of the vehicle and atmosphere falls below the first predetermined level, the gravitational forces upon the low pressure or soft valve element 14 cause the valve element to rotate back to the closed condition.

When the air pressure within the passenger compartment is greater than atmospheric pressure by a second predetermined level larger than the first predetermined level, i.e., a level to overcome the gravitational force and spring force upon the high pressure or hard valve element 16, the valve element 16 will rotate, in a direction outward of the housing 12, about the axes of the pivot shafts 120 to uncover the central air passage 24 and enable air flow from the passenger compartment to atmosphere. The low pressure or soft valve element 14 may move along with the high pressure or hard valve element 16 or move into the open condition prior to movement of the high pressure or hard valve element 16.

When the high pressure or hard valve element 16 rotates about the axes of the pivot shafts 120 to uncover the central air passage and enable air flow from the passenger compartment to atmosphere, the valve elements 14 and 16 are in open conditions. When the differential air pressure between the passenger compartment of the vehicle and atmosphere falls below the second predetermined level, the gravitational forces and spring force acting upon the high pressure or hard valve element 16 cause the valve element to rotate back to the closed condition. The low pressure or soft valve element 14 may remain in the open condition. If the differential air pressure falls below the first predetermined level, the low pressure or soft valve element 14 will rotate to the closed condition.

Figure 11:
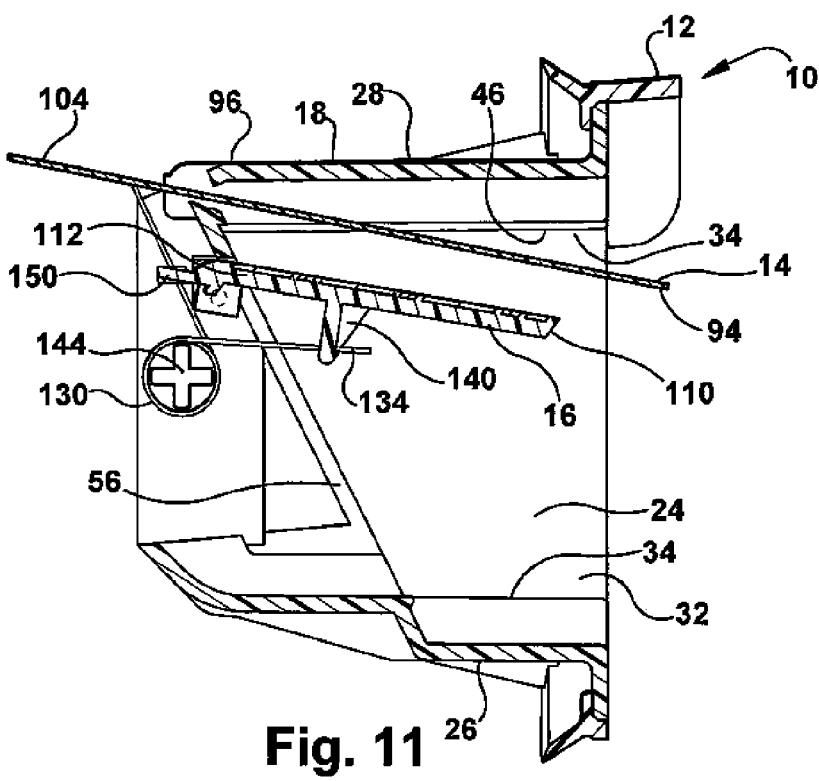
FIG. 11 is an enlarged view of FIG. 9.

When the high pressure or hard valve element 16 rotates from the closed condition toward the open condition, the torsion spring 130 is wound onto the support shaft 144 on the housing 12. The projection 140 on the valve element 16 moves radially outwardly away from the axis of the torsion spring 130, as seen in FIGS. 9 and 11. Even though torsion spring 130 is wound onto the support 144, the force applied by the torsion spring to the high pressure or hard valve element 16 to urge the valve element 16 toward the closed condition remains substantially constant or reduces due to the projection 140 moving radially outwardly from the axis of the spring 130. Accordingly, when the differential air pressure is above the second predetermined level, the high pressure or hard valve element 16 opens quickly.

It is contemplated that instead of one flap valve element, multiple flap valve elements can be connected with the housing in multiple through holes to form the pressure relief valve 10. Also, the high pressure or hard valve element 16 may include openings to permit more air flow when the low pressure or soft valve element 14 is in the open condition and the hard valve element 16 is in the closed condition.

The embodiment of the invention illustrated in FIGS. 12-16 is generally similar to the embodiment of the invention illustrated in FIGS. 1-11. Therefore, similar numerals will be utilized to identify similar components, the suffix letter "a" being added to the numerals associated with FIGS. 12-16 to avoid confusion.

A pressure relief valve 10a (FIG. 12) is used to vent a compartment in a vehicle, in much the same manner as previously described in conjunction with the embodiment of the invention illustrated in FIGS. 1-11. The pressure relief valve 10a includes a housing 12a in which a low pressure or soft valve element 14a and a high pressure or hard valve element 16a are pivotally mounted. The valve elements 14a and 16a control the flow of air from a compartment of a vehicle in a manner similar to the manner previously described in conjunction with the embodiment of the invention illustrated in FIGS. 1-11.

The low pressure or soft valve element 14a opens when there is a first or relatively small pressure differential between a compartment of a vehicle and the atmosphere surrounding the vehicle. The high pressure or hard valve element 16a opens when there is a second or larger pressure differential between the compartment of the vehicle and the atmosphere surrounding the vehicle. If there is a gradual increase in the pressure in the compartment of the vehicle, the low pressure or soft valve element 14a will open before the high pressure or hard valve element 16a opens. If there is a sudden or rapid increase in the pressure in the compartment of the vehicle, the low pressure or soft valve element 14a and high pressure or hard valve element 16a may open at substantially the same time.

The housing 12a (FIG. 12) has a side wall 18a which extends around an air flow passage 24a. A divider wall 202 (FIGS. 12 and 15) divides the air flow passage 24a into an upper (as viewed in FIGS. 12 and 15) air flow passage section 204 and a lower air flow passage section 206. The upper and lower air flow passage sections 204 and 206 are substantially the same size. However, one of the air flow passage sections 204 or 206 may be larger than the other air flow passage section if desired.

Figure 12:
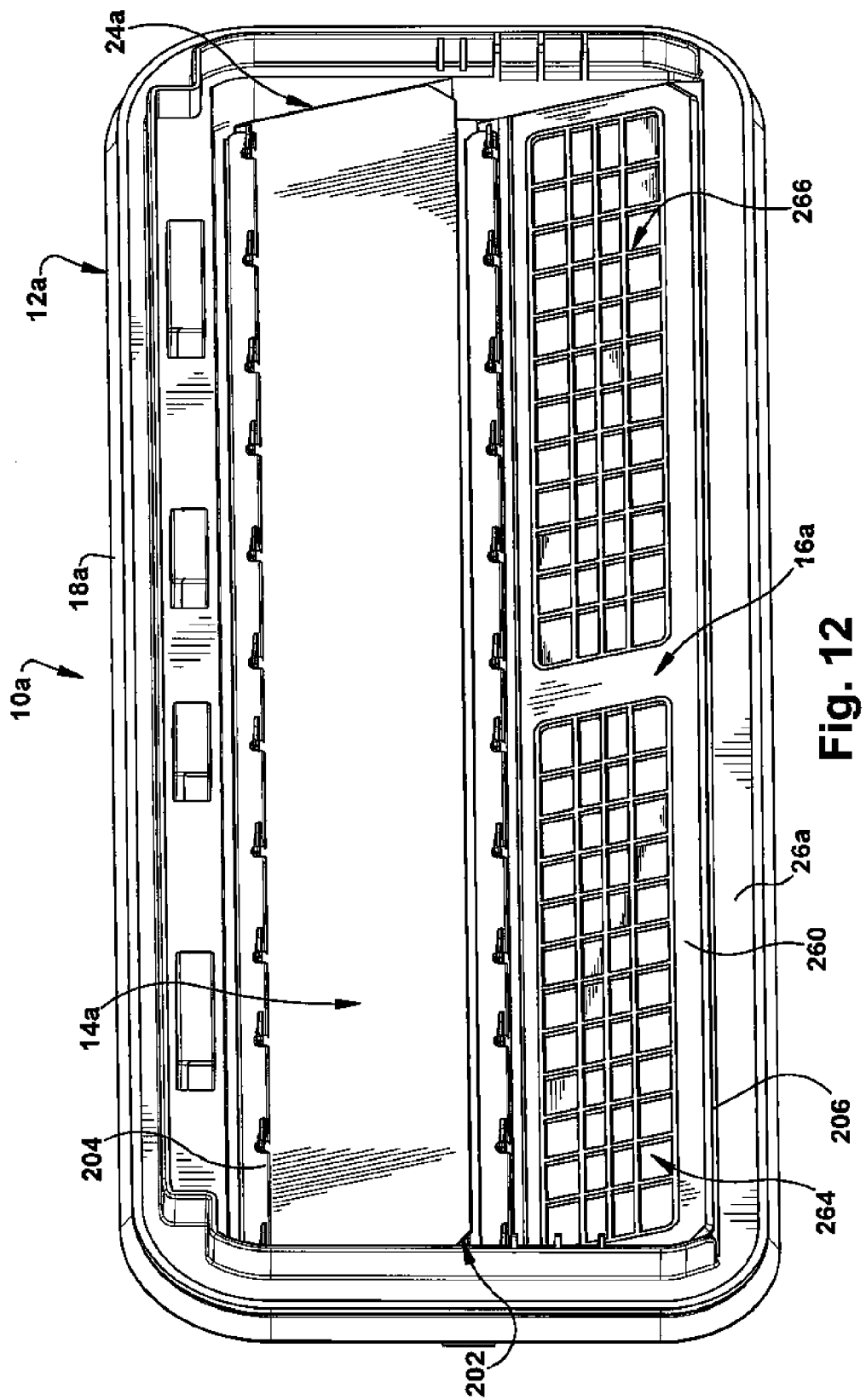
FIG. 12 is a front view of a second embodiment of the pressure relief valve, the front view taken from outside of a compartment.

In the embodiment of the invention illustrated in FIG. 12, the housing 12a has a rectangular configuration. The air flow passage 24a also has a rectangular configuration. It is contemplated that the housing 12a and/or air flow passage 24a may have a different configuration if desired. For example, the housing 12a and the air flow passage 24a may have a circular or oval configuration.

Figure 13:
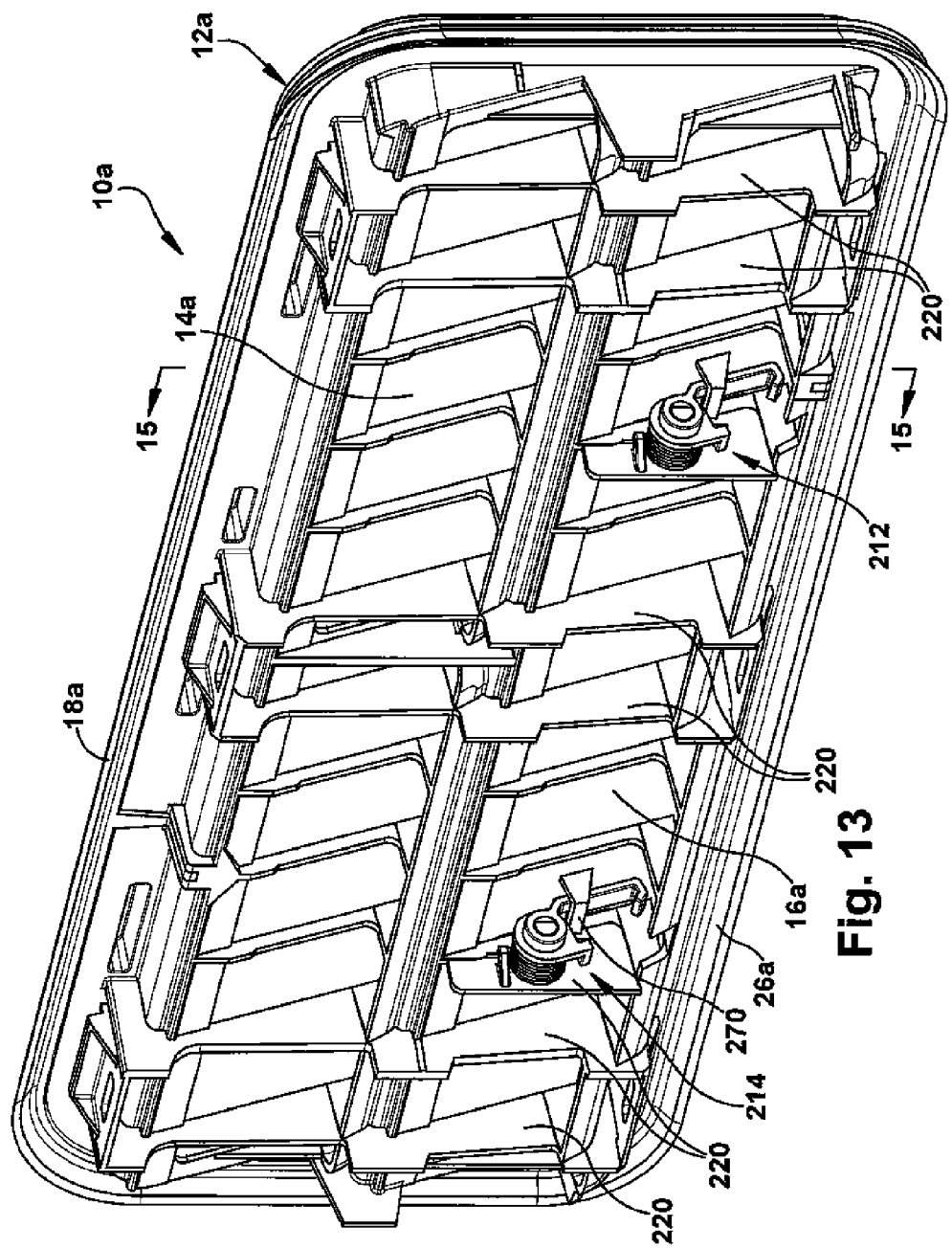
FIG. 13 is a rear view of the pressure relief valve of FIG. 12 from inside the compartment and showing the pressure relief valve in a closed condition.

A pair of identical biasing assemblies 212 and 214 (FIGS. 13, 14 and 15) are connected with the high pressure or hard valve element 16a. The biasing assemblies 212 and 214 are connected with the high pressure valve element 16a at a location which is approximately midway between upper and lower (as viewed in FIG. 15) edge portions of the high pressure valve element. Although two biasing assemblies 212 and 214 are shown in FIG. 13, only a single biasing assembly may be used. Alternatively, more than two biasing assemblies may be used.

The biasing assemblies 212 and 214 (FIG. 13) urge the high pressure or hard valve element 16a toward the closed condition illustrated in FIGS. 12-15. Although biasing assemblies 212 and 214 are provided to urge the high pressure or hard valve element 16a toward the closed condition, similar biasing assemblies are not provided in association with the low pressure or soft valve element 14a. Thus, the low pressure or soft valve element 14a is urged toward its closed condition under the influence of gravity and the natural resilience of the soft, flexible polymeric material forming the valve element 14a. However, it should be understood that one or more biasing assemblies may be associated with the low pressure valve element 14a if desired.

The identical biasing assemblies 212 and 214 are effective to maintain the high pressure valve element 16a in the closed condition illustrated in FIGS. 12-15 during relatively small increases in fluid pressure in the compartment of the vehicle. However, the soft valve element 14a is free to move from its closed condition toward its open condition under the influence of a relatively small increase in the pressure in the compartment of the vehicle. For example, assuming that the compartment of a vehicle is a passenger compartment and that a relatively small increase in the air pressure in the passenger compartment occurs, the low pressure valve element 14a will move from its closed condition illustrated in FIGS. 12-15, toward its open condition illustrated in FIG. 16. During this relatively small increase in the air pressure in the passenger compartment of the vehicle, the high pressure valve element 16a will be maintained in the closed condition illustrated in FIGS. 12-15 by the biasing assemblies 212 and 214. The relatively small rise in the pressure in the passenger compartment of the vehicle may be due to many different causes, for example, the closing of a door of the vehicle.

One or more biasing assemblies, similar to the biasing assemblies 212 and 214, maybe provided in association with the low pressure or soft valve element 14a. If biasing assemblies are provided in association with the low pressure valve element 14a, they would be weaker than the biasing assemblies 212 and 214 provided in association with the high pressure valve element 16a. This would enable the low pressure vale element 14a to open under the influence of relatively low air pressure in the compartment of the vehicle while the high pressure valve element 16a remains closed.

Figure 14:
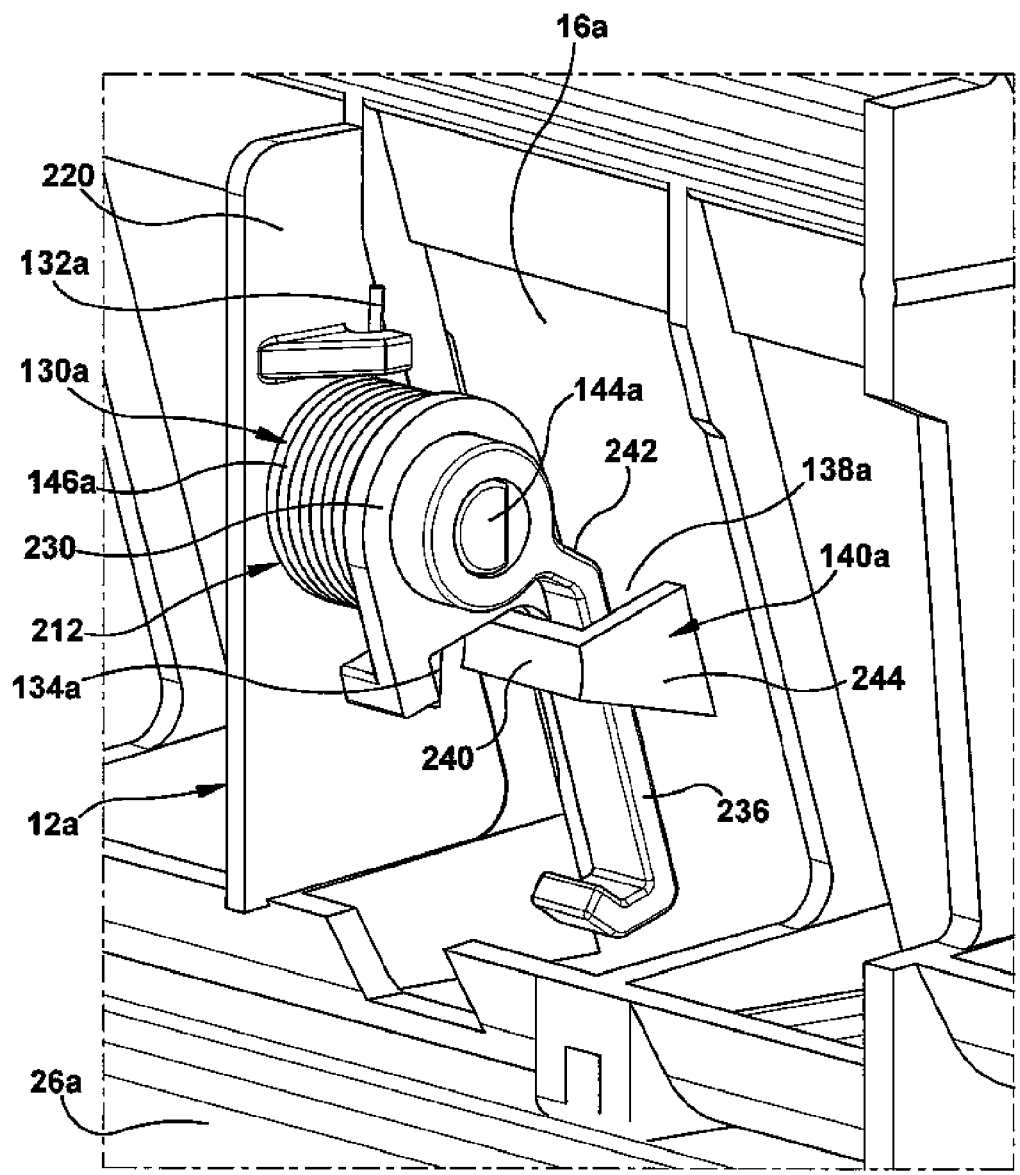
FIG. 14 is an enlarged view of a portion of FIG. 13.
Figure 15:
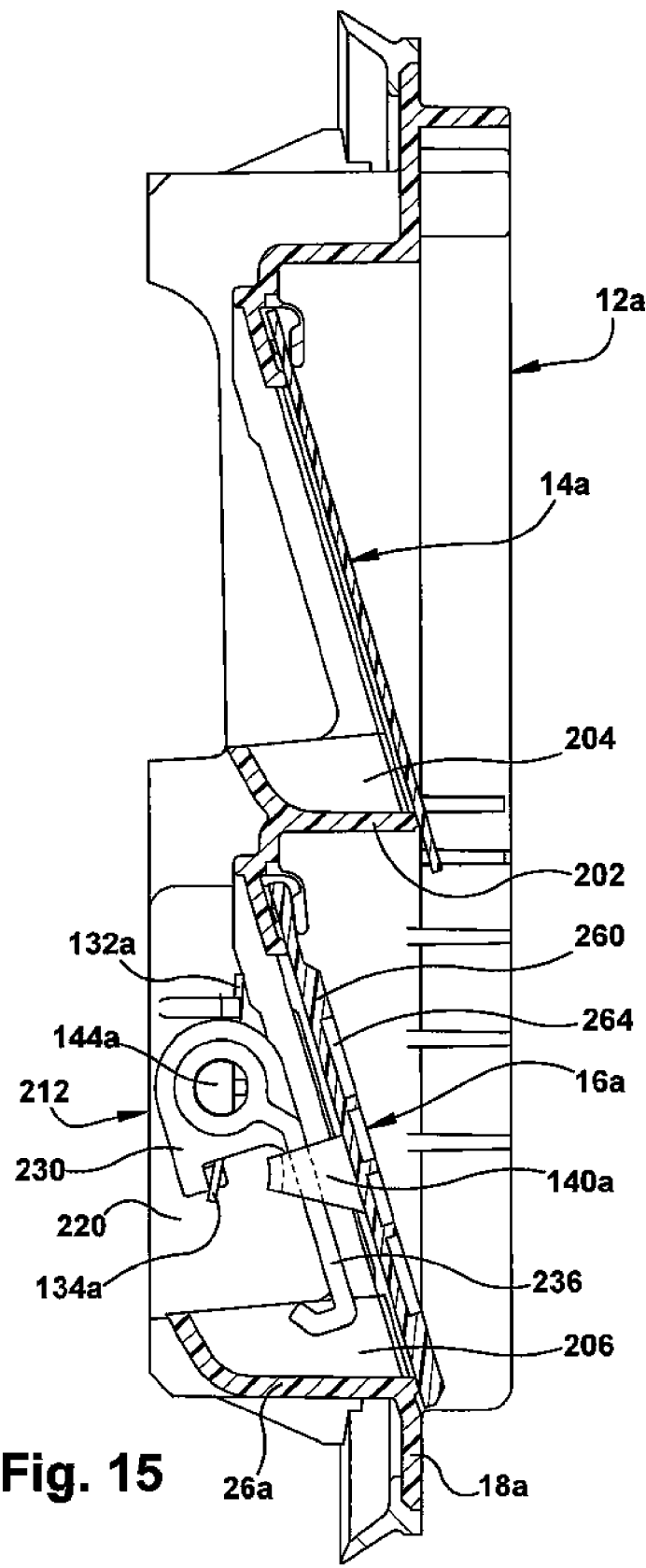
FIG. 15 is a sectional view, taken generally along the line 15-15 of FIG. 13.
Figure 16:
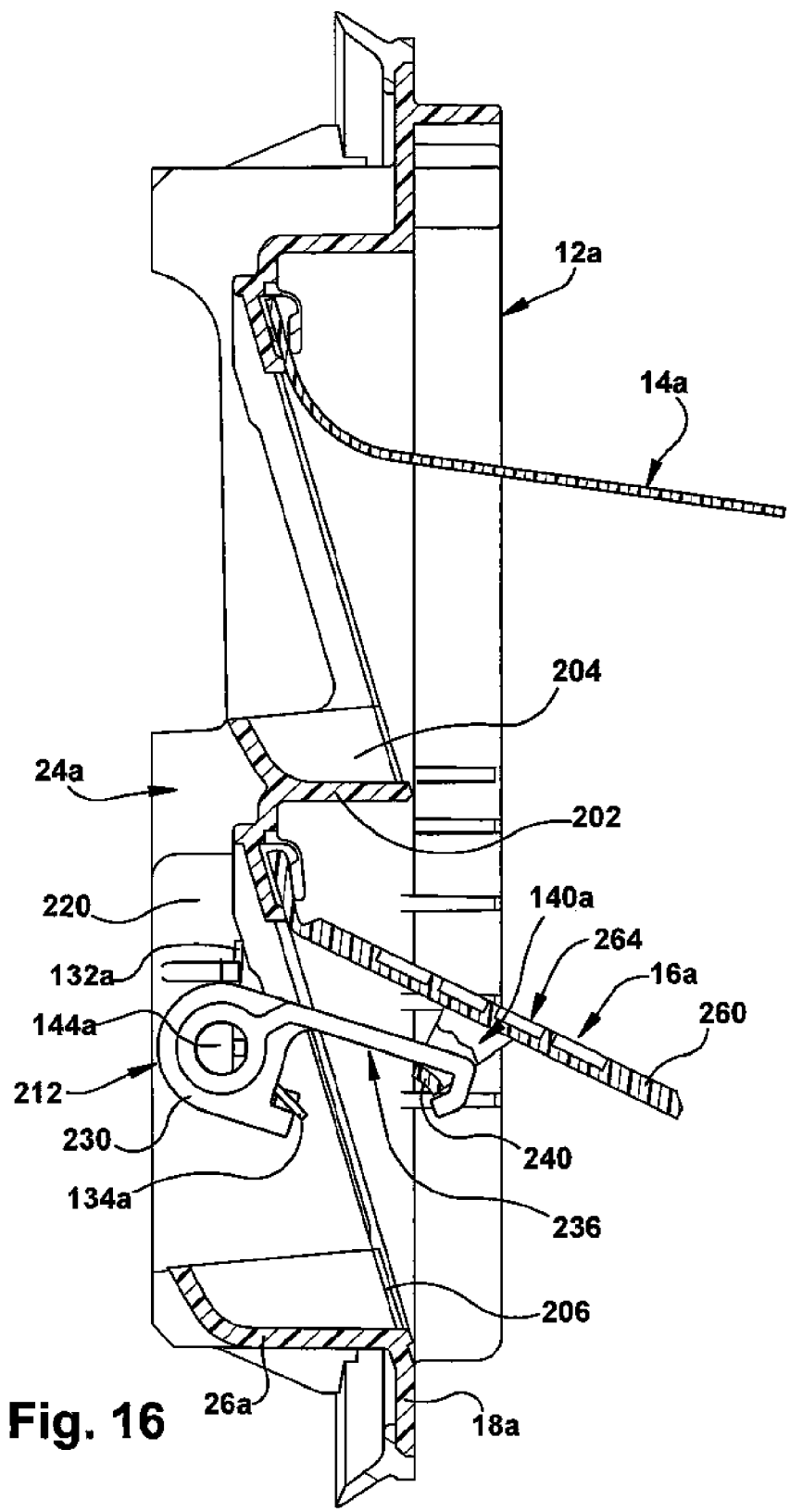
FIG. 16 is a fragmentary sectional view, similar to FIG. 15, illustrating valve elements in the pressure relief valve in an open condition.

When the low pressure or soft valve element 14a is resiliently flexed and moves to the open condition illustrated in FIG. 16 and the high pressure or hard valve element 16a is in the closed condition illustrated in FIGS. 12-15, a flow of air is conducted from the compartment of the vehicle through the upper air flow passage section 204 (FIG. 16) to the atmosphere surrounding the vehicle. As this occurs, the air pressure in the passenger compartment of the vehicle is reduced to atmospheric pressure. As the air pressure in the compartment of the vehicle is reduced to atmospheric pressure, the low pressure valve element 14a moves from the open condition of FIG. 16 back to the closed condition of FIGS. 12-15. During the flow of low pressure air through the upper air flow passage section 204 of the housing 12a, the high pressure or hard valve element 16a remains in its closed condition (FIGS. 12-15) and blocks the flow of air from the passenger compartment through the lower air flow passage section 206.

Upon the occurrence of a relatively large increase in the fluid pressure in the compartment of a vehicle, both the low pressure valve element 14a and the high pressure valve element 16a move from the closed condition illustrated in FIGS. 12-15 to the open condition illustrated in FIG. 16. Upper portions (as viewed in FIG. 16) of the low and high pressure valve elements 14a and 16a are resiliently flexed about parallel, spaced apart, axes as the valve elements are pivoted to the open condition of FIG. 16. If desired, the low and/or high pressure valve elements 14a and/or 16a may be mounted on one or more rods connected with the housing 12a. If this is done, the valve elements 14a and/or 16a would not be resiliently flexed to enable the valve elements to move between the open and closed conditions.

When the valve elements 14a and 16a are both in the open condition (FIG. 16), air can flow from the compartment of the vehicle through both the upper and lower air flow passage sections 204 and 206 of the air flow passage 24a to the atmosphere around the vehicle. As this occurs, the air pressure in the passenger compartment or other compartment of the vehicle is quickly reduced from a relatively high pressure. This enables the valve elements 14a and 16a to move from the open condition of FIG. 16 back to the closed condition of FIG. 15. Due to the influence of the biasing assemblies 212 and 214, the high pressure valve element 16a will move from the open condition of FIG. 16 back to the closed condition of FIG. 15 while the low pressure valve element 14a is still in an open condition. A relatively large increase in the fluid pressure in the passenger compartment may be the result of many different causes, for example, the increase in fluid pressure may be caused by activation of an air bag.

The biasing assembly 212 includes a torsion spring 130a (FIG. 14) which applies a force to urge the high pressure valve element 16a toward the closed condition of FIGS. 12-15. The torsion spring 130a has a central axis which extends parallel to and is offset to one side of the axis about which the high pressure or hard valve element 16a pivots. The torsion spring 130a works by torsion or twisting and is effective to store mechanical energy when it is twisted. The illustrated torsion spring 130a is of the helical coil type.

The torsion spring 130a has a stationary end portion 132a (FIG. 14) which is connected with the housing 12a. The housing 12a has a plurality of frame or brace sections 220 which extend across or span the lower air flow passage section 206 (FIGS. 13-15). The frame or brace sections 220 are relatively thin and provide only a minor obstruction to the flow of air from the compartment of the vehicle through the lower air flow passage section 206. The frame or brace sections 220 extend between the divider wall 202 and a lower section 26a of the side wall 18a (FIGS. 13 and 15).

In the embodiment of the invention illustrated in FIG. 14, a cylindrical coiled portion 146a of the torsion spring 130a is wrapped around a cylindrical portion of a hub 230 (FIG. 14). The hub 230 is rotatably mounted on a support member 144a. The support member 144a is fixedly connected to a frame or brace section 220 (FIG. 14) of the housing 12a. The hub 230 and support member 144a have coincident central axes which extend parallel to and are spaced downward (as viewed in FIGS. 14 and 15) from an axis about which the high pressure valve element 16a pivots.

The hub 230 is rotatable relative to the support member 144a against the resistance of the torsion spring 130a. As the hub 230 rotates relative to the support member 144a, the metal rod forming the hollow, cylindrical coiled portion 146a of the helical torsion spring 130a is deflected. As the torsion spring 130a is deflected, the movable end portion 134a moves relative to the fixed end portion 132a of the torsion spring. As this occurs, the torsion spring 130a is subjected to twisting.

In the embodiment of the invention illustrated in FIGS. 1-11, the movable end portion 134 (FIGS. 5 and 10) of the torsion spring 130 forms a spring arm which extends between the high pressure or hard valve element 16 (FIGS. 10 and 11) and the coiled portion 146 of the torsion spring 130. In the embodiment of the invention illustrated in FIG. 14, a spring arm 236 is provided to interconnect the movable end portion 134a of the torsion spring 130a and a projection 140a which is fixedly connected to and moves with the high pressure or hard valve element 16a. The spring arm 236 (FIG. 14) slides in a slot formed by the projection 140a. The spring arm 236 of FIG. 14 cooperates with the projection 140a in a manner similar to the manner in which the movable end portion 134 (FIGS. 10 and 11) of the spring 130 cooperates with the projection 140.

The projection 140a (FIG. 14) has a generally U-shaped configuration with its leg portions fixedly connected to the high pressure or hard valve element 16a. The spring arm 236 slides along a bight or cross section 240 of the projection 140a. The bight or cross section 240 extends between parallel leg sections 242 and 244 (FIG. 14) of the projection 140a. The leg sections 242 and 244 are integrally formed as one piece with the bight or cross section 240 and are fixedly connected with the high pressure or hard valve element 16a.

When the high pressure valve element 16a moves from the closed condition of FIG. 15 toward the open condition of FIG. 16, the torsion spring 130a is wound onto the hub 230 (FIG. 14) as the hub rotates (in a counterclockwise direction as viewed in FIG. 14) on the stationary support member 144a. The projection 140a moves outwardly as the valve element 16a pivots in a counterclockwise direction (as viewed in FIG. 15) from its closed condition toward an open condition. As this occurs, the projection 140a on the valve element 16a moves away from a central axis of the torsion spring 130a.

Even though the torsion spring 130a is wound onto the hub 230 which is rotatably mounted on the stationary support 144a, the force applied by the torsion spring 130a to the valve element 16a to urge the valve element toward the closed condition remains substantially constant or reduces due to the projection 140a moving outwardly from the central axis of the coil portion 146a of the torsion spring 130a. Accordingly, when the differential air pressure is of a sufficient magnitude to overcome the influence of the biasing assemblies 212 and 214, the high pressure or hard valve element 16a opens quickly.

Assuming that there is a relatively small rise in the pressure in the passenger compartment of the vehicle, the low pressure or soft valve element 14a is resiliently flexed and moves from the closed condition of FIG. 15 toward the open condition of FIG. 16. As this occurs, air will flow from the compartment of the vehicle through the upper air flow passage section 204 to the atmosphere around the vehicle. This will result in a reduction in the air pressure in the compartment of the vehicle to a pressure which is close to atmospheric pressure. As this occurs, the low pressure or soft valve 14a will move from an open condition toward a closed condition (FIG. 15).

When the low pressure or soft valve element 14a is in the closed condition of FIG. 15, the valve element sealingly engages the divider wall 202 and flanges extending into the upper air flow passage section 204 from the side wall 18a of the housing 12a. Flanges extend into the upper air flow passage section 204 in the same manner as in which the flanges 54 and 56 of the embodiment of the invention illustrated in FIG. 4 extend inwardly into the central air flow passage 24 from the side wall sections 30 and 32. This results in the low pressure or soft valve element 14a blocking the flow of air through the upper air flow passage section 204 when the valve element 14a is in its closed condition (FIG. 15).

During the previously described operation of the low pressure or soft valve element 14a from the closed condition of FIG. 15 toward the open condition of FIG. 16, the high pressure or hard valve element 16a remains in the closed condition of FIG. 15. This is because the air pressure in the compartment of the vehicle did not increase to a value sufficient to overcome the influence of the biasing assemblies 212 and 214 (FIG. 13). Therefore, the high pressure or hard valve element 16a remained in the closed condition of FIG. 15 and blocked the flow of air through the lower air flow passage section 206.

If there is a relatively large increase in the air pressure in the passenger compartment of the vehicle, both the low pressure valve element 14a and the high pressure valve element 16a will move from their closed conditions (FIG. 15) to their open conditions (FIG. 16). This enables air to flow from the passenger compartment through both the upper air flow passage section 204 and the lower air flow passage section 206. By opening both the low pressure valve element 14a and the high pressure valve element 16a, a relatively large flow of air maybe quickly conducted through the air flow passage 24a to equalize the pressure in the passenger compartment of the vehicle and the atmosphere surrounding the vehicle.

As the pressure in the passenger compartment is reduced, the hard valve element 16a will move from the open condition of FIG. 16 back to the closed condition of FIG. 15. Shortly thereafter, the low pressure valve element 14a will move from the open condition of FIG. 16 back to the closed condition of FIG. 15.

As the high pressure valve element 16a begins to move from the closed condition of FIG. 15 toward the open condition of FIG. 16, the high pressure valve element is resiliently flexed and the hub 230 (FIG. 14) is rotated in a counterclockwise direction about a central axis of the support member 144a. As this occurs, the movable end portion 134a of the torsion spring 130a moves from the position illustrated in FIGS. 14 and 15 toward the position illustrated in FIG. 16. This movement of the movable end portion 134a of the torsion spring 130a is effective to deflect the torsion spring by twisting it about the coincident central axes of the torsion spring and the hub 230. The central axis of the torsion spring 130a is coincident with the central axis of the support member 144a and the axis about which the hub 230 rotates. The central axis of the torsion spring 130a is parallel to and offset (downward as viewed in FIG. 16) from the axis about which the high pressure valve element 16a is flexed.

The hub 230 is rotated, in a counterclockwise direction as viewed in FIGS. 14-16, by force transmitted from the high pressure valve element 16a to the spring arm 236. The spring arm 236 engages the projection 140a connected with the high pressure valve element 16a. As the high pressure valve element 16a rotates in a counterclockwise direction (as viewed in FIGS. 15 and 16), the spring arm 236 slides along the bight or cross section 240 (FIG. 14) of the projection 140a. As this occurs, the distance between the central axis of the support member 144a about which the coil portion 146a (FIG. 14) of the torsion spring 130a is deflected and the location where the projection 140a engages the spring arm 236 increases. As the distance between the location where the projection 140a engages the spring arm 236 and the central axis of the support member 144a and the torsion spring 130a increases, the circular coils forming the coil portion 146a of the torsion spring 130a are deflected.

The force transmitted between the high pressure valve element 16a through the projection 140a and the spring arm 236 remains substantially constant or reduces as the torsion spring 130a is deflected. Increasing the distance between the location where the projection 140a engages the spring arm 236 and the coincident central axes of the support member 144a and torsion spring 130a increases the lever arm through which force transmitted.

As the high pressure valve element 16a moves toward the open condition of FIG. 16, the location where the projection 240 engages the spring arm 236 moves outwardly away from the torsion spring 130a, that is, toward the right as viewed in FIG. 16. This increases the lever arm through which force is transmitted between the high pressure valve element 16a and the torsion spring 130a. Although the deflection of the torsion spring 130a increases the torque applied by the torsion spring 130a, the lever arm through which force is transmitted between the high pressure valve element 16a and the torsion spring also increases so that the force applied by the torsion spring to the high pressure valve element remains substantially constant or reduces.

Since the torque transmitted from the torsion spring 130a is increasing at a relatively slow rate while the effective length of the spring arm 236 is increasing at a faster rate, the biasing force transmitted between the torsion spring and the high pressure valve element 16a tends to remain constant or reduces. The effective length of the spring arm 236 is equal to the distance from the location where the spring arm engages the projection 140a to the coincident central axes of the torsion spring 130a, hub 230 and support member 144a. The axis about which the high pressure valve element 16a pivots is offset from and is parallel to the central axis of the torsion spring 130a. This results in the net closing force transmitted from the torsion spring 130a to the high pressure valve element 16a remaining substantially constant or reducing as the high pressure valve element moves toward the open condition. This enables the high pressure valve element 16a to quickly move from the closed condition of FIG. 15 to the open condition of FIG. 16.

As the air pressure in the passenger compartment of the vehicle decreases, the identical biasing assemblies 212 and 214 are effective to move the high pressure valve element 16a back to the closed condition of FIG. 15. Although only the biasing assembly 212 has been discussed in the immediately preceding paragraphs, it should be understood that the biasing assembly 214 has the same construction and cooperates with the high pressure valve element 16a in the same way as the biasing assembly 212. In the illustrated embodiment of the invention there are two biasing assemblies 212 and 214 which bias the high pressure valve element 16a toward the closed condition. However, a greater or lesser number of biasing assemblies may be provided.

When the high pressure valve element 16a is in the closed condition of FIG. 16, the high pressure valve element engages the lower side wall section 26a (FIG. 15) and flanges extending inwardly from the side wall 18a. The flanges which are engaged by the hard valve element 16a when it is in the closed condition correspond to the flanges 54 and 56 on the embodiment of the invention illustrated in FIG. 1-11. Engagement of the high pressure valve element 16a with the flanges on the sidewall 18a seals the lower air flow passage 206 (FIG. 15).

The spring arm 236 has a generally J-shaped configuration. This configuration ensures that the spring arm 236 will remain connected with the projection 140a during movement of the high pressure valve element 16a between the open and closed condition. A central axis of the spring arm 236 extends transverse to the parallel axes about which the low pressure valve element 14a and high pressure valve element pivot between their open and closed conditions. In addition, the hook-shaped end portion of the spring arm 236 engages the bight 240 (FIG. 14) on the projection 140a to limit outward (counterclockwise as viewed in FIG. 16) pivotal movement of the high pressure valve element 16a.

The spring arm 236 may have the same straight configuration as the movable end portion 134 (FIGS. 5, 10 and 11) of the torsion spring 130. If desired, the spring arm 236 may be eliminated. If this is done, the movable end portion 134a (FIG. 14) of the torsion spring 130a may be used to connect the torsion spring with the high pressure valve element 16a. If the movable end portion 134a of the torsion spring 130a is used to interconnect the high pressure valve element 16a and the torsion spring, the movable end portion may have a straight configuration (FIGS. 10 and 11), a U-shaped configuration similar to the spring arm 236 (FIG. 14), or any other desired configuration.

The low pressure valve element 14a is formed of a relatively soft and flexible polymeric material. This flexible polymeric material is readily deflected when the air pressure in the passenger compartment of the vehicle increases by a relatively small amount. This relatively small increase in the air pressure in the passenger compartment of a vehicle is ineffective to move the high pressure valve element 16a against the influence of the biasing assemblies 212 and 214 (FIG. 13). The low pressure valve element 14a has the same general construction as the soft valve element 14 of the embodiment of the invention illustrated in FIGS. 1-11. However, the low pressure valve element 14a does not overlie the high pressure valve element 16a. The low pressure valve element 14a pivots about an axis which extends parallel to the axis about which the high pressure valve element 16a pivots and is parallel to the central axis of the torsion spring 130a.

The high pressure valve element 16a has a flexible base portion 260. Although the base portion 260 is resiliently flexible, it is not as flexible as the soft valve element 14*a*. The flexible construction of the base portion 260 of the high pressure valve element 16*a* enables the rim or perimeter of the base portion 280 of the high pressure valve element to securely seal against the housing 12*a* when the high pressure valve element 16*a* is in the closed condition of FIG. 15. The flexible construction of the base portion 260 of the high pressure valve element 16*a* enables it to resiliently flex about a pivot axis as the high pressure valve element moves between the open and closed conditions. If desired, the base portion 260 of the high pressure valve element 16*a* may be formed of the same resiliently flexible material as the low pressure valve element 14*a*.

A pair of rigid panels 264 and 266 are mounted on the flexible base portion 260 (FIG. 12) of the high pressure valve element 16*a*. The two rigid panels 264 and 266 are interconnected by only the base portion 260. However, if desired, the two rigid panels 264 and 266 may be interconnected by another connection. The two rigid panels 264 and 266 may be formed as one panel. Alternatively, the two rigid panels 264 and 266 may be interconnected by connectors which extend between the two rigid panels. Although the base portion 260 is flexible, the base portion has sufficient rigidity to substantially maintain the spatial relationship illustrated in FIG. 12 between the rigid panels 264 and 266. The base portion 260 extends across and blocks air flow through the lower air flow passage section 206 when the high pressure valve element 16*a* is in the closed condition.

The projection 140*a* (FIG. 15) is integrally formed as one piece with the rigid panel 264 (FIG. 12). Of course, the projection 140*a* may be formed separately from the rigid panel and fixedly connected to the rigid panel. The projection 140*a* extends through an opening formed in the base section 260 to enable the projection 140*a* to be engaged by the spring arm 236 in the manner illustrated in FIGS. 15 and 16.

The rigid panel 266 has the same construction as the rigid panel 264. The rigid panel 266 has a projection 270 (FIG. 13) which is engaged by a spring arm in the biasing assembly 214 (FIG. 13). The projection 270 has the same configuration and construction as the projection 140*a*.

In the embodiment of the invention illustrated in FIGS. 12-16, the high pressure valve element 16*a* has a pair of rigid panels 264 and 266 which are mounted on the relatively flexible base section 260. If desired, the base section 260 may be omitted and the high pressure valve element 16*a* constructed as a single rigid panel, similar to the manner in which the valve element 16 of FIG. 2 is constructed. Alternatively, the high pressure valve element 16*a* may be constructed as two separate valve elements. Thus, two separate panels may form the high pressure valve element 16*a*. One of these panels would be connected with the biasing assembly 212. The other panel would be connected with the biasing assembly 214. A greater or lesser number of biasing assemblies may be provided if desired.

If desired, the torsion springs in the biasing assemblies 212 and 214 may be formed with different force constants and connected with separate valve elements. This would result in one of the valve elements moving from its closed condition toward its open condition under the influence of a lower fluid pressure in the passenger compartment of the vehicle than is required to move the other valve element from its closed condition toward its open condition.

In the embodiment of the invention illustrated in FIGS. 1-11, the spring arm is integrally formed as one piece with the coil portion 146 of the torsion spring 130 (FIGS. 4, 5, 10, and 11). Thus, the movable end portion 134 of the torsion spring 130 functions in the same manner as does the spring arm 236 of the embodiment of the invention illustrated in FIGS. 12-16. If desired, the torsion spring 130*a* in the biasing assembly 212 (FIG. 14) may utilize the movable end portion 134*a* as the spring arm. If this was done, the spring arm 236 would be eliminated and the movable end portion 134*a* of the torsion spring 130 would engage the projection 140*a* in the same manner as previously described in connection with the embodiment of the invention illustrated in FIGS. 1-11.

From the above description of both the embodiment of the invention illustrated in FIGS. 1-11 and the embodiment of the invention illustrated in FIGS. 1-12, those skilled in the art will perceive improvements, changes, and modifications. For example, soft valve element 14*a* (FIGS. 15 and 16) may overlie the hard valve element 16*a* in the manner illustrated in association with the embodiment of the invention described in connection with FIGS. 1-11. As another example, the torsion springs in the biasing assemblies 212 and 214 (FIG. 13) may be replaced with springs having a different configuration and/or mode of operation, for example, a straight configuration. Although metal torsion springs 130*a* are utilized as the biasing springs 212 and 214, a torsion spring of a different material may be utilized. For example, a resilient polymeric material may be utilized as the torsion spring. Such improvements, changes and modifications within the skill of the art are intended to be covered by the appended claims.

Having described the invention, the following is claimed:

1. An apparatus for use in venting a compartment in a vehicle, said apparatus comprising:
    a housing which at least partially defines an air flow passage,
    a valve element which is movable from a closed condition to an open condition to enable air to flow through said air flow passage,
    a spring which is deflected as said valve element moves from the closed condition toward the open condition and is effective to urge said valve element toward the closed condition, and
    a spring connection interconnecting said spring and said valve element, said spring connection transmitting a substantially constant force urging said valve element toward the closed condition as said valve element moves toward the open condition,
    said spring connection including an end portion of said spring, said end portion of said spring transmitting force from said spring to said valve element, said end portion of said spring and said valve element being relatively movable to change a distance between a portion of said spring and a location where force is transmitted to said valve element as said valve element moves toward the open condition.

2. An apparatus as set forth in claim 1 wherein said valve element pivots about a first axis as said valve element moves from the closed condition to the open condition, said spring is a coil spring having a second axis which is spaced from said first axis, said spring is twisted about said second axis as said spring is deflected.

3. An apparatus as set forth in claim 1 wherein said valve element has a first portion which is pivotally connected with said housing and a second portion which moves away from a portion of said housing upon movement of said valve element from the closed condition toward the open condition, said spring connection being connected with said valve element at a location disposed between said first and second portions of said valve element.

4. An apparatus as set forth in claim 3 wherein a distance between said spring and said second portion of said valve element changes as said valve element moves from the closed condition to the open condition.

5. An apparatus as set forth in claim 3 wherein said valve element has an inner side surface which is exposed to fluid pressure in the compartment of the vehicle when said valve element is in the closed condition, said inner side surface of said valve element moves away from said spring as said valve element moves from the closed condition to the open condition.

6. An apparatus as set forth in claim 1 further including a second valve element having a closed condition restricting air flow through the air flow passage and an open condition to enable air to flow through the air flow passage, said second valve element being free of a spring which urges said second valve element toward the closed condition.

7. An apparatus as set forth in claim 6 wherein said second valve element and said valve element overlie each other when said second valve element and said valve element are in their closed conditions.

8. An apparatus as set forth in claim 6 wherein said valve element blocks air flow through a first portion of said air flow passage when said valve element is in the closed condition and said second valve element blocks air flow through a second portion of said air flow passage when said second valve element is in the closed condition.

9. An apparatus as set forth in claim 6 wherein said housing includes a wall section which separates a first portion of said air flow passage from a second portion of said air flow passage, said valve element being disposed adjacent a first side of said wall section so that said valve element is effective to block said first portion of said air flow passage and is ineffective to block said second portion of said air flow passage when said valve element is in the closed condition, said second valve element being disposed adjacent a second side of said wall sections so that said second valve element is effective to block said second portion of said air flow passage and is ineffective to block said first portion of said air flow passage when said second valve element is in the closed condition.

10. An apparatus as set forth in claim 1 further including a second valve element having a closed condition restricting air flow through the air flow passage and an open condition to enable air to flow through the air flow passage, said second valve element including a second spring connection interconnecting a second spring and the second valve element, the second spring being weaker than the spring connected with the first valve element.

11. An apparatus as set forth in claim 1, wherein a spring force of said spring increases as said valve element moves from the closed condition toward the open condition.

12. An apparatus as set forth in claim 1, wherein a closing force applied to said valve element is the same when said valve element is in the closed condition, the open condition, and as said valve element moves between the closed condition and the open condition.

13. An apparatus for use in venting a compartment in a vehicle, said apparatus comprising:
    a housing which at least partially defines an air flow passage,
    a valve element which is movable from a closed condition to an open condition to enable air to flow through said air flow passage,
    a spring which is deflected as said valve element moves from the closed condition toward the open condition and is effective to urge said valve element toward the closed condition, and
    a spring connection interconnecting said spring and said valve element, said spring connection transmitting a substantially constant force urging said valve element toward the closed condition as said valve element moves toward the open condition,
    wherein said spring connection includes a spring arm, said spring arm transmits force from said spring to said valve element, said spring arm and said valve element being relatively movable to change a distance between said spring and a location where force is transmitted to said valve element as said valve element moves toward the open condition.

14. An apparatus for use in venting a compartment in a vehicle, said apparatus comprising:
    a housing which at least partially defines an air flow passage,
    a first valve element which is movable from a closed condition to an open condition under the influence of a fluid pressure in the compartment of the vehicle, said first valve element has a first end portion connected with said housing, and a second end portion which moves away from said housing upon movement of said first valve element from the closed condition toward the open condition,
    a second valve element which is movable from a closed condition to an open condition under the influence of fluid pressure in the compartment of the vehicle, said second valve element being free of a spring connection, and
    a spring which is deflected as said first valve element moves from the closed condition toward the open condition and is effective to urge said first valve element toward the closed condition, said spring being connected with said first valve element at a location disposed between said first and second end portions of said first valve element.

15. An apparatus as set forth in claim 14 wherein said first valve element moves away from the closed condition toward the open condition under the influence of a first fluid pressure in the compartment of the vehicle, said second valve element moves away from the closed condition toward the open condition under the influence of a second fluid pressure in the compartment of the vehicle, said second fluid pressure being less than said first fluid pressure.

16. An apparatus as set forth in claim 14 wherein said first and second valve elements overlie each other when said first and second valve elements are in the closed condition.

17. An apparatus as set forth in claim 16 wherein said second valve element is movable relative to said first valve element under the influence of air flow conducted around a peripheral portion of said first valve element as said second valve element moves from the closed condition toward the open condition.

18. An apparatus as set forth in claim 14 further including a spring connection interconnecting said spring and said first valve element, said spring connection transmitting a substantially constant force urging said first valve element toward the closed condition as said first valve element moves toward the open condition.

19. An apparatus as set forth in claim 18 wherein said spring connection includes a spring arm which transmits force from said spring through said spring connection to said first valve element, said spring arm and said first valve element being relatively movable to change a distance between said spring and the location where force is transmitted to said first valve element as said first valve element moves toward the open condition.

20. An apparatus as set forth in claim 14 wherein said housing includes a wall section which separates a first portion of said air flow passage from a second portion of said air flow passage, said first valve element being disposed adjacent a first side of said wall section so that said first valve element is effective to block said first portion of said air flow passage and is ineffective to block said second portion of said air flow passage when said first valve element is in the closed condition, said second valve element being disposed adjacent a second side of said wall section so that said second valve element is effective to block said second portion of said air flow passage when said second valve element is in the closed condition.

21. An apparatus as set forth in claim 14 wherein said first valve element pivots about a first axis as said first valve element moves from the closed condition to the open condition, said spring is a coil spring having a second axis which is spaced from said first axis, said spring is twisted about said second axis as said spring is deflected.

22. An apparatus as set forth in claim 14 wherein said first valve element pivots about a first axis during movement of said first valve element from the closed condition to the open condition, said second valve element pivots about a second axis during movement of said second valve element from the closed condition to the open condition, said second axis is spaced from and extends parallel to said first axis, said spring having coils wound around a third axis which is spaced from said first and second axes, a spring connection interconnecting said spring and said first valve element, said spring connection including a spring arm which transmits force from said spring through said spring connection to said first valve element, said spring arm having a central axis which extends transverse to said first and second axes, said spring arm and said first valve element being relatively movable to change a distance between said spring and the location disposed between said first and second end portions of said first valve element where said spring is connected with said first valve element.

* * * * *